(12) United States Patent
Le Phan (10) Patent No.: US 8,872,761 B2
(45) Date of Patent: Oct. 28, 2014

(54) METHOD AND DEVICE FOR PROCESSING SIGNALS FROM A POINTING DEVICE

(75) Inventor: Kim Le Phan, Eindhoven (NL)

(73) Assignee: NXP, B.V., Eindhoven (NL)

( * ) Notice: Subject to any disclaimer, the term of this patent is extended or adjusted under 35 U.S.C. 154(b) by 394 days.

(21) Appl. No.: 13/059,451

(22) PCT Filed: Aug. 11, 2009

(86) PCT No.: PCT/IB2009/053520
§ 371 (c)(1),
(2), (4) Date: Feb. 17, 2011

(87) PCT Pub. No.: WO2010/020906
PCT Pub. Date: Feb. 25, 2010

(65) Prior Publication Data
US 2012/0032881 A1 Feb. 9, 2012

(30) Foreign Application Priority Data

Aug. 21, 2008 (EP) ..................... 08162764

(51) Int. Cl.
*G06F 3/033* (2013.01)
*G06F 3/0338* (2013.01)
*G06F 3/038* (2013.01)
*G06F 3/03* (2006.01)
*G06F 3/0354* (2013.01)

(52) U.S. Cl.
CPC .......... *G06F 3/03548* (2013.01); *G06F 3/0338* (2013.01); *G06F 3/038* (2013.01); *G06F 3/0304* (2013.01)
USPC ........... 345/156; 345/157; 345/158; 345/159; 345/160; 345/161; 345/162; 345/163; 345/164; 345/165; 345/166; 345/167; 345/168; 345/169; 345/170; 345/179; 345/171; 345/172; 345/173; 345/174; 345/175; 345/176; 345/177; 345/178; 178/18.01; 178/18.02; 178/18.03; 178/18.04; 178/18.05; 178/18.06; 178/18.07; 178/18.08; 178/18.09

(58) Field of Classification Search
USPC .......... 345/156–179; 178/18.01–18.09, 18.11
See application file for complete search history.

(56) References Cited

U.S. PATENT DOCUMENTS 5,570,111 A * 10/1996 Barrett et al. ................. 345/157
5,764,219 A * 6/1998 Rutledge et al. .............. 345/159

(Continued)

FOREIGN PATENT DOCUMENTS

EP 0567215 A1 10/1993
EP 1850208 A1 10/2007

(Continued)

OTHER PUBLICATIONS

International Search Report for PCT/IB2009/053520, International searching Authority, 2009.

*Primary Examiner* — Alexander S Beck
*Assistant Examiner* — Jeffrey Steinberg (57) ABSTRACT

The invention relates to a pointing device and a method for processing signals from such a pointing device, said device comprising a base and an actuator movable with respect to the base, and a detector, said detector adapted for providing at least first and second positional signals indicating a position of the actuator with respect to the base along corresponding first and second axes, wherein said signal processing method comprises the steps of converting the at least two positional signals into a polar coordinate signal comprising a magnitude signal, and thresholding the magnitude signal of the polar coordinate signal to provide a thresholded magnitude signal. In an embodiment the method further comprising the step of applying a conversion curve to the thresholded magnitude signal to produce a velocity magnitude signal.

16 Claims, 7 Drawing Sheets

(56) References Cited

U.S. PATENT DOCUMENTS

| | | | |
|---|---|---|---|
| 5,959,863 A * | 9/1999 | Hoyt et al. | 700/85 |
| 6,326,948 B1 | 12/2001 | Kobachi et al. | |
| 6,975,302 B1 * | 12/2005 | Ausbeck, Jr. | 345/161 |
| 8,558,162 B2 | 10/2013 | Phan Le | |
| 2004/0052016 A1 | 3/2004 | Takagi et al. | |
| 2008/0164076 A1 * | 7/2008 | Orsley | 178/18.01 |
| 2009/0073119 A1 | 3/2009 | Phan Le | |
| 2009/0101803 A1 | 4/2009 | Phan Le | |
| 2009/0231165 A1 | 9/2009 | Phan Le | |

FOREIGN PATENT DOCUMENTS

| | | |
|---|---|---|
| WO | 2007122556 A2 | 11/2007 |
| WO | 2007128972 A1 | 11/2007 |

* cited by examiner

METHOD AND DEVICE FOR PROCESSING SIGNALS FROM A POINTING DEVICE

FIELD OF THE INVENTION

The present invention is ion the field of handheld devices such as mobile phones, personal digital assistants (PDAs) and other mobile devices, such as laptop computers and digital cameras, comprising a pointing device.

BACKGROUND OF THE INVENTION

Handheld devices such as mobile phones, personal digital assistants (PDAs) and other mobile devices, such as laptop computers and digital cameras, nowadays are often equipped with a small pointing device, such as a joystick, to facilitate actions such as for example menu selection, navigation, gaming and web browsing. These pointing devices are capable of outputting positional signals which represent the position of an actuator with respect to a base of the device. The output signals are, for example, used for moving a cursor on a display screen.

The actuator itself may be biased to return to a rest position when no external force is exerted on it. Ideally, when the actuator is in its rest position, the device outputs corresponding positional signals indicating the rest position. In reality the value of the positional signals in this case often represents a position close to but not entirely equal the rest position; there is always some inevitable noise in the positional signals which can cause a cursor controlled by these signals to wobble on a display. Moreover, the actuator may be somewhat misaligned when in the rest position, causing an offset in the positional signal and corresponding cursor-drift.

To solve these problems, a threshold can be applied to the positional signal output of a pointing device. The cursor movement along a direction then becomes non zero only when the corresponding positional signal is larger than a certain threshold value. In order to eliminate cursor drift and wobbling when the actuator is in its rest position, the threshold is usually set to a value larger than noise and any likely residual offset.

A drawback of this thresholding method is that it can lead to anisotropic cursor movement and reduced sensitivity of the pointing device, in particular when at least one of the positional signals is close to an associated threshold value.

It is an object of the present invention to provide a signal processing method for at least reducing undesired anisotropic cursor movement.

It is a further object of the present invention to improve the accuracy of a pointing device.

SUMMARY OF THE INVENTION

To this end, a first aspect of the invention provides a signal processing method for a pointing device, said device comprising a base and an actuator movable with respect to the base, and a detector, said detector adapted for providing at least first and second positional signals indicating a position of the actuator with respect to the base along corresponding first and second axes, said signal processing method comprising the steps of:

converting the at least two positional signals into a polar coordinate signal comprising a magnitude signal, and thresholding the magnitude signal to provide a thresholded magnitude signal.

Especially for positional signals in which the magnitude of at least one of the first or second positional signal has a low value, the present method reduces unwanted anisotropic movements or wobbling of a cursor controlled by a pointing device implementing this method.

For example, when a user wants to move the cursor in a direction which is slightly away from one of the X and Y directions using a joystick, then the joystick generates X- and Y positional signals. Assuming the Y signal is just below the threshold, but the X signal is above it, then after thresholding the X and Y signals, the joystick would only output a signal indicating a displacement of the actuator with respect to the base in the X direction. This would make the cursor move along the X direction, instead of the slanted direction as desired.

To solve this problem, the method of the invention converts the two positional signals into a polar coordinate signal comprising a magnitude signal and an angle signal, and subsequently thresholds the magnitude signal. If the magnitude signal is below the threshold, the thresholded magnitude signal is zero and the cursor does not move. If however the thresholded magnitude signal is larger than zero then it forms, together with the angle signal, a good indication of the position and/or tilt of the actuator with respect to the base, even if one of the X and Y signals has a low value.

In an embodiment the signal processing method further comprises the step of applying a conversion curve to the thresholded magnitude signal to produce a velocity magnitude signal, said curve preferably being an exponential or polynomial function. The nonlinear function implies that the higher the magnitude signal, the faster the cursor will move on the display. Conversely, the lower the magnitude signal, the slower the cursor will move. Thus around the threshold value the cursor will move slowly, which further suppresses undesired anisotropic cursor movement, in particular when the magnitude signal is close to its associated threshold value, i.e. when both X and Y signals have low values.

The combination of thresholding the polar coordinate magnitude signal and applying a velocity conversion, using in particular a nonlinear conversion function, yields a significant improvement in the accuracy of a pointing device, since both measures add to the accuracy of the pointing device in a complementary manner.

In an embodiment the signal processing method further comprises the step of converting the velocity magnitude signal and the angle signal to x- and y-velocity signals in an orthogonal coordinate system. This step is provided to make further processing of the velocity signals more convenient as many devices equipped with a pointing device use an orthogonal coordinate system.

In an embodiment the signal processing further comprises the steps of:

converting the thresholded magnitude signal and the angle signal into thresholded positional signals, applying a conversion curve to each of the thresholded positional signals to produce respective velocity signals, said curve preferably being an exponential or polynomial function. In this embodiment a different curve can be applied to each of the thresholded positional signals individually, for example, to account for an aspect ratio of a display on which a cursor can be moved.

In an embodiment the thresholding step of signal processing method comprises outputting positional signals with the value zero in case the magnitude signal is below a predetermined threshold value, or otherwise applying a velocity conversion curve to each of the positional signals to produce velocity signals. By applying the velocity conversion curve to the original positional signals the step of converting the polar coordinates back into the original positional coordinate system can be omitted.

In an embodiment the signal processing method comprises the steps of:

detecting and storing offset signals when the actuator is in a rest position, detecting positional signals and subtracting the stored offset signals from these. Actuators of small pointing devices are often biased towards a rest position at which the positional signals provided by the detector should be zero, but are not because of, for example, misalignment of the actuator, wear and/or defects in the detector. By subtracting the offset signals from positional signals found in further measurements, the offset can be corrected for, yielding a method for offset calibration.

In an embodiment or second aspect, the present invention provides a signal processing method for a pointing device, said device comprising a detector, said detector comprising a plurality of detection units capable of providing a plurality of corresponding detection unit signals and a common mode signal comprising the sum of magnitudes of the detection unit signals, said method comprising the step of determining a derivative of the common mode signal over time, and one or both of the following steps:

generating a first output signal when the derivative rises above a predetermined click threshold indicating click action, generating a second output signal when the derivative falls below a predetermined release threshold indicating a release action. This method can be applied in particular to a common mode signal originating from an optical joystick, for example as revealed in U.S. Pat. No. 6,326,948.

During use of the pointing device, the common mode signal may vary due to signal drift, for example resulting from changes in temperature of the detector units and/or signal noise. Also, when a user changes the value of the common mode signal, for example, by pressing down on an actuator for a longer period of time, he or she can gradually and accidentally use more or less force to press down the actuator, thus unwillingly changing the common mode signal. The value of the common mode signal as such is therefore not very suitable for detecting a click action. By using the derivative of the common mode signal it becomes possible to detect sudden changes over time in the common mode signal. When click and release actions are determined based on the derivative of the common mode signal, the perceived accuracy of the pointing device can be improved. Due to possible differences in duration of the click and release actions, dependent for example on the spring used to move the actuator back into its rest position, the absolute values of the click and release thresholds may be defined separately.

An embodiment or a third aspect of the invention provides a signal processing method for a pointing device, said device comprising a detector, said detector adapted for providing at least first and second positional signals indicating a position of the actuator with respect to the base along corresponding first and second axes, said detector further comprising a plurality of detection units capable of providing a plurality of corresponding detection unit signals and a common mode signal comprising the sum of magnitudes of the detection unit signals, in which the common mode signal is indicative of the position of the actuator along a third axis substantially normal to the first and second axes, said common mode signal preferably being used as indicative of a zoom level.

In combination with the method for determining clicked and released signals this method can offer an intuitive zooming function to the user. For example, a user can move a cursor to a spot, click to select the spot, and while still holding the actuator in a clicked position, slowly exert more or less pressure on the actuator to zoom in and out. It may also be possible to move the cursor around while the actuator is still in a clicked position, for example to move around a map which has been zoomed in on, or as part of a so called drag-and-drop sequence.

According to a further aspect the present invention provides a pointing device comprising a base, an actuator movable with respect to the base, a detector for detecting the relative position between the actuator and the base, and signal processing means, wherein the detector is adapted for providing at least a first positional signal indicating the position of an actuator about a first axis, and a second positional signal indicating the position of the actuator about a second axis, wherein the signal processing means are arranged for processing the positional signals from the detector according to any of the methods described earlier herein.

In an embodiment said first and second axes are substantially orthogonal.

In an embodiment of the device the signal processing means comprise an instruction processor arranged for executing a series of instructions for implementing any of the methods described herein. The series of instructions can be read by the instruction processor from a suitable medium, for example an EEPROM. The medium can be reprogrammed or changed for instance to implement different sensitivity settings for different applications.

In an embodiment of the pointing device according to the present invention the pointing device is comprised in an integrated package.

In an embodiment the pointing device is an optical pointing device comprising a base on which the detector is located, an actuator movable with respect to the base and a reflective portion on a side facing the base, said detector comprising one or more detection units for detecting at least a part of the light reflected by the reflective portion of the actuator, and the base further comprising a light source for emitting light towards the reflective portion of the actuator.

In an embodiment the signal processing means for processing at least two positional signals are arranged for processing signals according ant of the methods described herein.

The various aspects and features described and shown in the specification can be applied individually, wherever possible. These individual aspects, in particular the methods for offset calibration, signal to velocity conversion, and click and zoom functions as well as other aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE DRAWINGS

The method and device disclosed herein can be used in handheld devices such as a mobile phone, PDA, digital camera, laptop computer and the like.

Figure 1A:
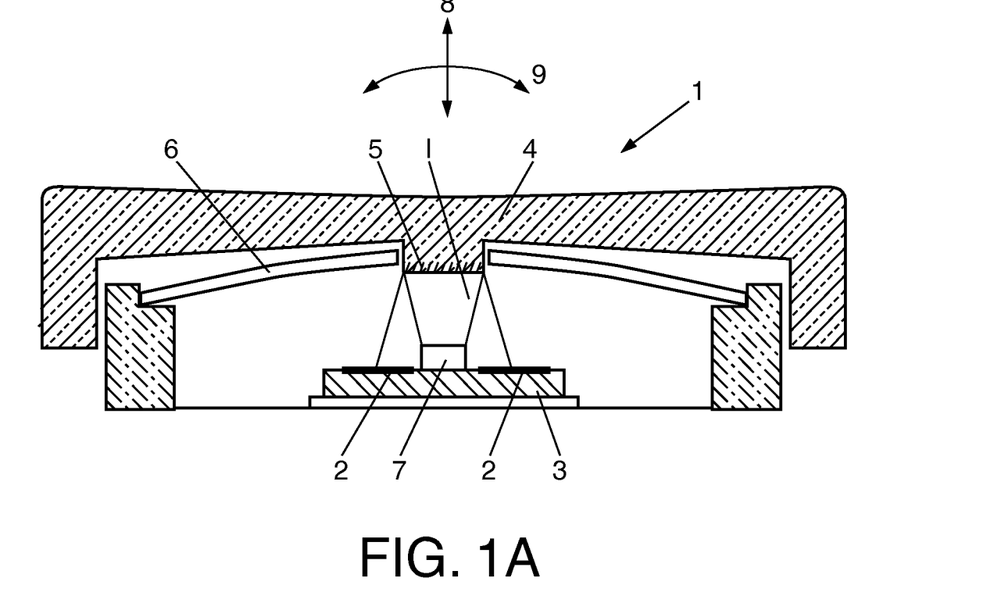
FIG. 1A shows an example of an optical pointing device which might be used in combination with the method according to the present invention.

In FIG. 1A an exemplary pointing device, in this case an optical pointing device 1 for use with the method is shown comprising a base 3 and an actuator 4 movable with respect to the base, wherein the actuator 4 comprises a reflective portion 5 on a side facing the base. The base further comprises a light source 7 for emitting light I towards the reflective portion of the actuator, a detector comprising one or more detection units 2 for detecting at least part of the light reflected by the reflective portion of the actuator, and a spring 6 which connects the actuator 4 to the housing of the base 3 and biases the actuator towards a rest position. Movement of the actuator in a direction of tilt 9 and/or translational movement in a vertical direction 8 causes a change in positional signals output by the device. Obviously in some embodiments not shown here translational movement of the actuator in the horizontal plane can be used as well to cause a change in the positional signals output by the device.

Figure 1B:
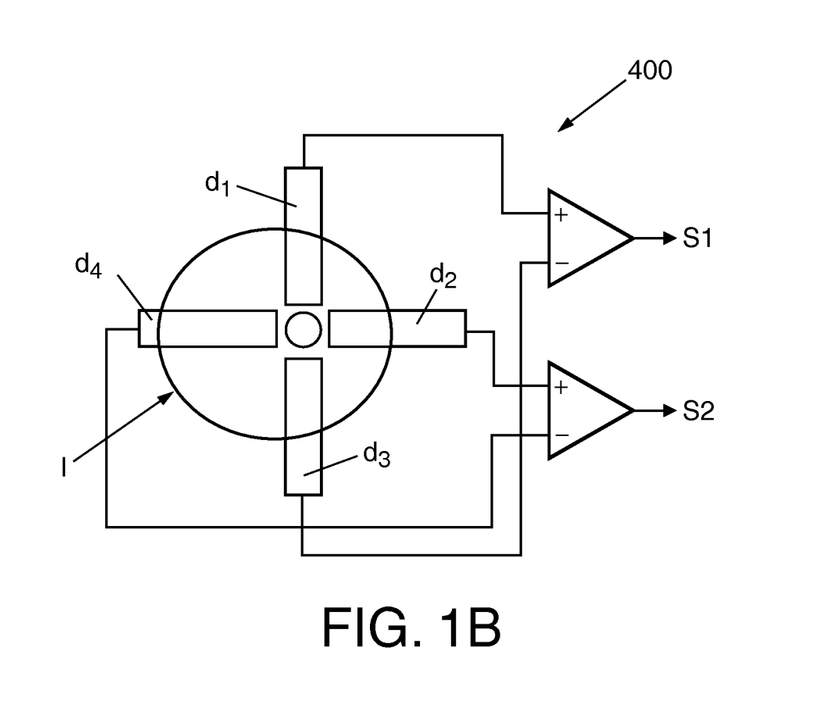
FIG. 1B shows an example of a detector for providing positional signals.

In FIG. 1B, a detector is shown which might be part of a pointing device as shown in FIG. 1A. The positional signals provided by the detector are suitable to be processed using the method of the current invention. The detector 400 comprises several, in this case four, detection units d1-d4. In this example the detection units are comprised of photosensitive diodes which generate an analog signal when a light spot I is directed onto them. The position of the light spot can be changed by moving the actuator (not shown). In this example the signals from the detection units are combined to form two differential positional signals S1, S2 to be processed by signal processing means (not shown). Other configurations are possible as well; for example there could be 6 detectors placed in a hexagonal grid or other shape, providing 6 positional signals to be processed by the signal processing means. Alternatively the detector can provide digital signals; groups of photosensitive diodes can be placed on a grid in the detector, and by using a threshold detection circuit at each photosensitive diode the signal can be digitized. In such a discrete detection scheme, discrete positional signals can be obtained by counting the number of "1s" and "0s" for each group.

Figure 2A:
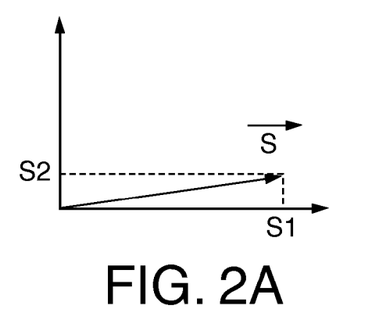
FIG. 2A is an example graph showing two positional signals output by a joystick.

In FIG. 2A we see a graph of two positional signals S1, S2 from a detector, forming a single direction vector S. The positional signals in this case comprise two orthogonal signals but could also comprise more than two and/or non-orthogonal signals. For example, an extra positional signal indicating the movement of the actuator about a diagonal axis might could be used to achieve a higher accuracy and redundancy, or the detection units could be placed in a manner in which the axial directions do not make a substantially 90 degree angle.

Figure 2B:
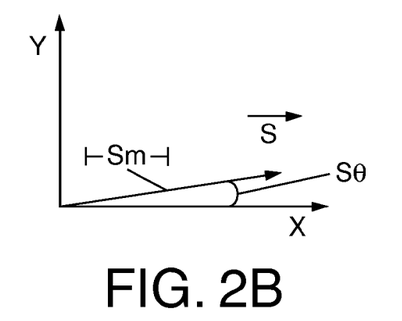
FIG. 2B is a graph of the positional signals of FIG. 2A after conversion to polar coordinate magnitude and angle signals.

The positional signals are converted into polar coordinates as shown in FIG. 2B. The polar coordinates comprise an angle $S_\theta$ signifying the angle between the direction vector S resulting from the positional signals and the horizontal axis in a Cartesian coordinate system, and further comprise a magnitude signal Sm signifying the length of said direction vector. The position and/or tilt of the actuator is now represented by the polar coordinates.

Figure 2C:
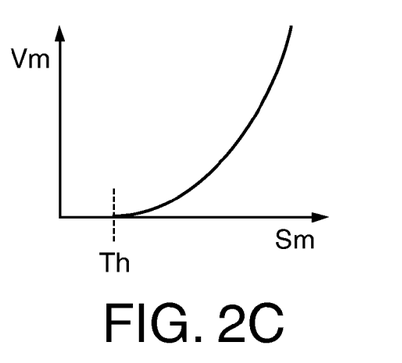
FIG. 2C shows an example thresholding and velocity conversion curve which can be applied to the polar coordinate magnitude signal to produce a velocity magnitude signal.

Following this coordinate conversion, a thresholding and velocity conversion curve is applied to the magnitude signal in FIG. 2C. The threshold part of the curve serves to eliminate the effects of an offset of the actuator when it is in its rest position and reduces drift of for example a cursor controlled by the output signals. If the magnitude signal Sm is below the threshold signal it is completely cut-off, resulting in a magnitude signal of zero. The angle signal is not thresholded and represents the unaltered detected angle. The other part of the curve, the velocity conversion part, is used to convert a positional magnitude into a velocity magnitude. This part of the curve preferably follows a polynomial or exponential function. If, as in FIG. 2C, this function is approximately quadratic, then each increase in the positional magnitude leads to a squared increase in the velocity magnitude signal. This enables a user to rapidly move, for example, a cursor controlled by the velocity signal, to an area of interest by substantially moving the actuator, and then move the cursor much more accurately by slightly moving the actuator.

Figure 2D:
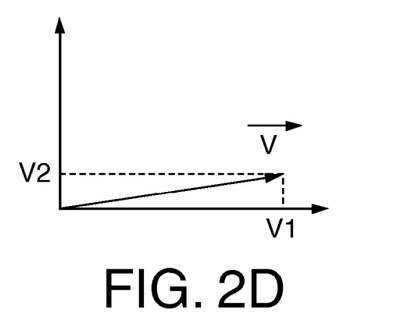
FIG. 2D shows a graph of two velocity signals in an orthogonal coordinate system derived from the polar coordinate angle signal of FIG. 2B and the velocity magnitude signal of FIG. 2C.

In FIG. 2D the angle signal and the velocity magnitude signal are converted into two dimensional velocity signals in a Cartesian coordinate system to make further processing of the velocity signals more convenient. Alternatively conversions to other suitable coordinate systems may be implemented.

Figure 3:
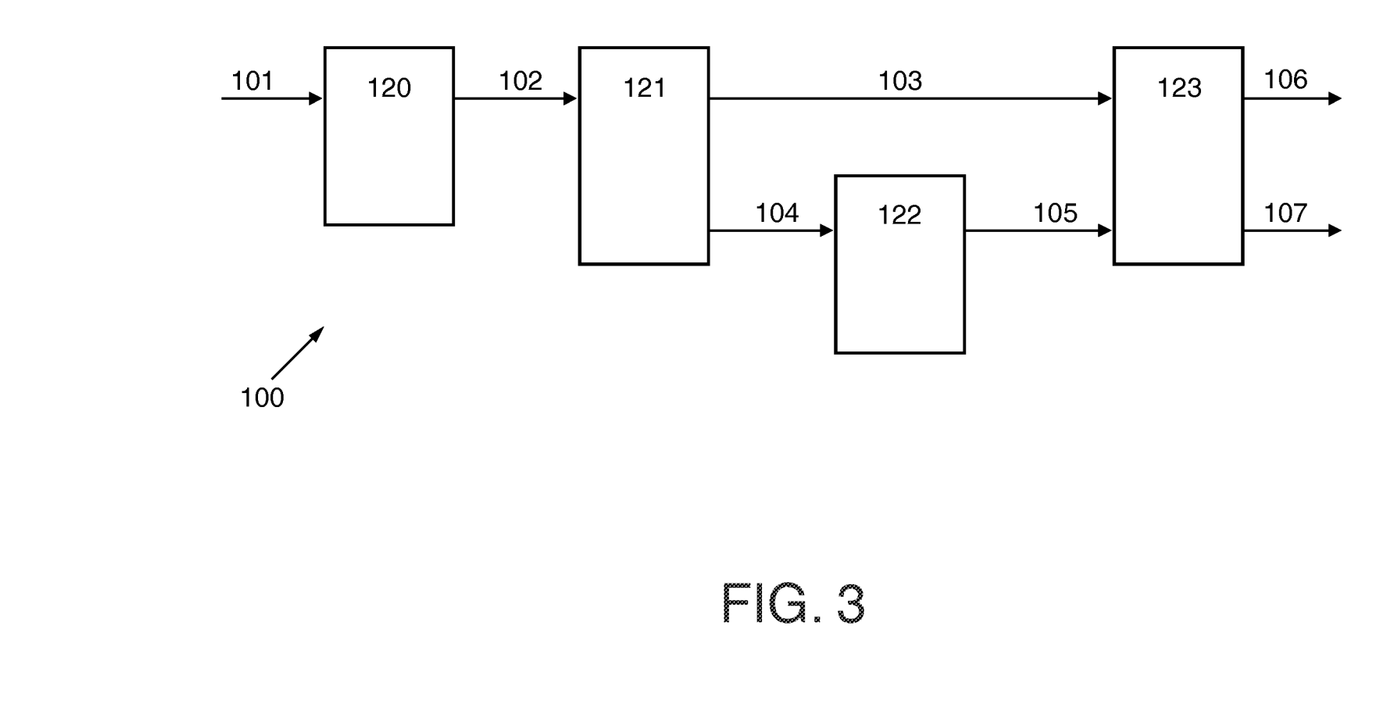
FIG. 3 shows a block diagram of a series of elements which can be used to implement a signal processing method according to the present invention.

In FIG. 3 a series of elements which can be used to implement signal processing of positional signals from a pointing device according to the present invention are shown in a block diagram. This embodiment includes offset calibration, which is performed in two stages. In the first stage, offset signals obtained when the actuator is in a rest position are stored in a memory. This stage can be initiated for example right after the manufacture of the pointing device, every time the device is powered on, anytime a user requires it, anytime the measurements seen inappropriate, or occasionally during the lifetime of the device. Alternatively the first stage be initiated every time the pointing device is brought from a sleeping mode into an active mode. As the actuator must be in a rest position for the calibration to work, the calibration for example be triggered by a release signal as described herein; it is likely that the actuator is in its rest position shortly after releasing it.

The second stage of the calibration comprises subtracting the offset signals obtained when the actuator was in a rest position from subsequently measured signals. During normal operation of a pointing device most of the time will be spend in the second stage.

The calibration procedure can help reduce or eliminate signal drift that can occur due to for example misaligned and/or defective detection units or an incorrectly biased actuator.

During normal operation, the signal processing device 100 obtains positional signals 101 from a pointing device and the earlier stored offset signals are subtracted from the present positional signals by subtraction unit 120. The resulting corrected positional signals 102 are then passed on to polar coordinate conversion unit 121 which converts the corrected positional signals 102 into an angle signal 103 and a magnitude signal 104. A thresholding and velocity conversion curve is then applied to the magnitude signal 104 at thresholding and velocity conversion unit 122. The velocity conversion curve is preferably a non-linear function with an increasing slope, preferably a polynomial or exponential function. The non-linear function implies that the more force the user applies to the actuator, thus the higher the velocity magnitude signal and the (much) faster the cursor will move on the display. This results in a velocity magnitude signal 105. When a user releases the actuator, the velocity magnitude returns to zero and the cursor stops moving.

The velocity magnitude signal is passed along with the angle signal 103 to Cartesian conversion unit 123. Cartesian conversion unit 123 converts the polar coordinate vector 103, 105 to orthogonal velocity signals 106, 107 suitable for convenient controlling the movement of a cursor on a display device for example.

In this paragraph an additional example of a possible sequence of processing steps according to the presented invention will be given. In the beginning when a host device having a display with a cursor (such as a phone) is powered up or brought from the sleeping mode to the active mode, its cursor coordinates are reset, i.e. the cursor is set at the middle of the display and calibration is started. During this action, the joystick should not be touched by the user. After this step, the device is ready for use. Suppose that the user is moving or tilting the actuator into a certain position using a certain force. The positional signals are read out and, if necessary, an incorrect offset is corrected for. The corrected positional signals are transformed into polar coordinate signals, thresholded and converted into X-Y cursor speeds. In the next step, the relative movements in the X and Y directions with respect to a previous measurement are calculated. The relative X (or Y) movement is equal to the X (or Y) cursor speed times the amount of time between two measurements of the positional signals. This amount of time is usually the time needed for one refresh cycle of the host device. The new X-Y coordinate is then calculated from the old coordinate and the relative X-Y movements. Finally the cursor position on the display is updated. A loop is created to continuously read the positional signals and update the coordinates of the cursor. The new coordinate of an iteration i is fed back to a new iteration i+1 and becomes the old coordinate in the calculation of this iteration.

Figure 4:
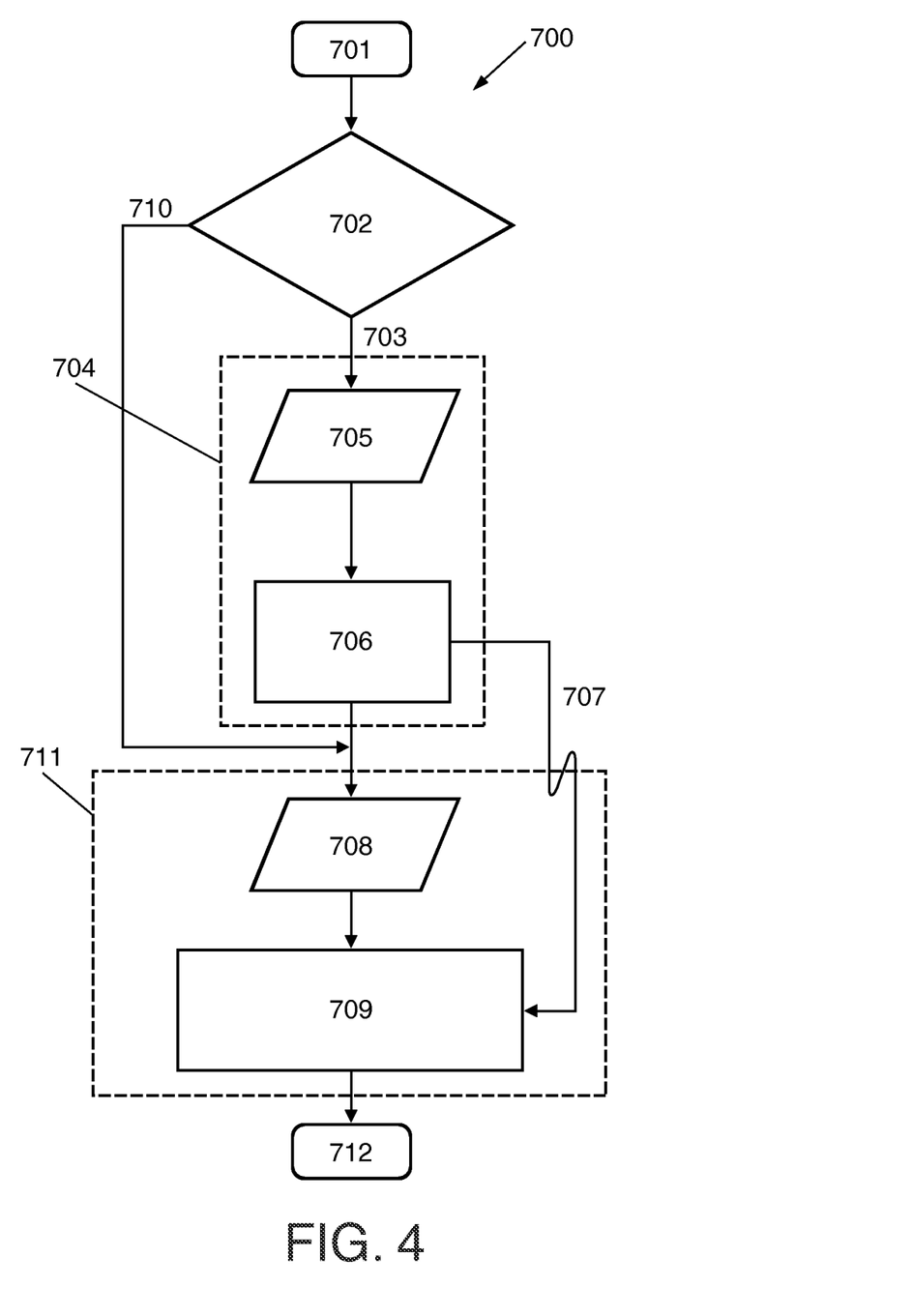
FIG. 4 shows a flow chart of the calibration part of the present method.

The calibration and offset elimination part of the present method is explained in more detail in FIG. 4. After the start 701 a choice 702 is made whether to initially perform the first stage 704 or to go straight on with the second stage 711 of the calibration. In case the first stage 703 has to be performed first, the positional signals are measured 705 and stored in memory 706 as offset signals 707. During the first stage of the calibration procedure 704 the actuator must be in a rest position.

After the first stage, or in case a choice to go straight to the second stage 710 was made at 702, the positional signals are measured at 708, after which the offset signals 707 stored earlier are subtracted from the positional signals in 709. The measuring 708 and subtracting 709 steps together form the second stage of the calibration. At 712 a complete calibrated measurement of positional signals has been performed. By starting the procedure again at 701 a positional signal measuring loop can be created.

Figure 5A:
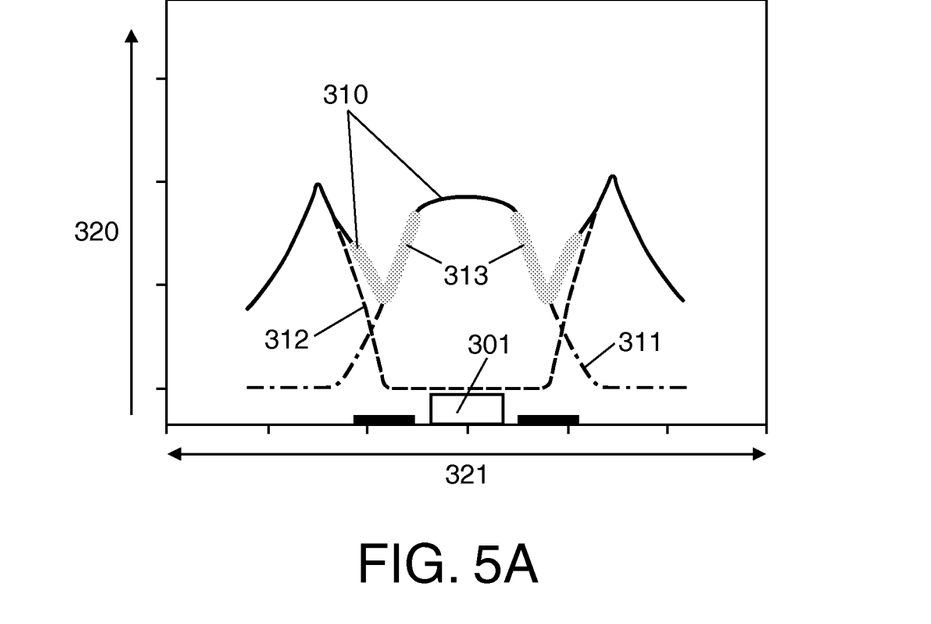
FIG. 5A shows a graph of a common mode signal of an optical joystick when the actuator is in a released position.
Figure 5B:
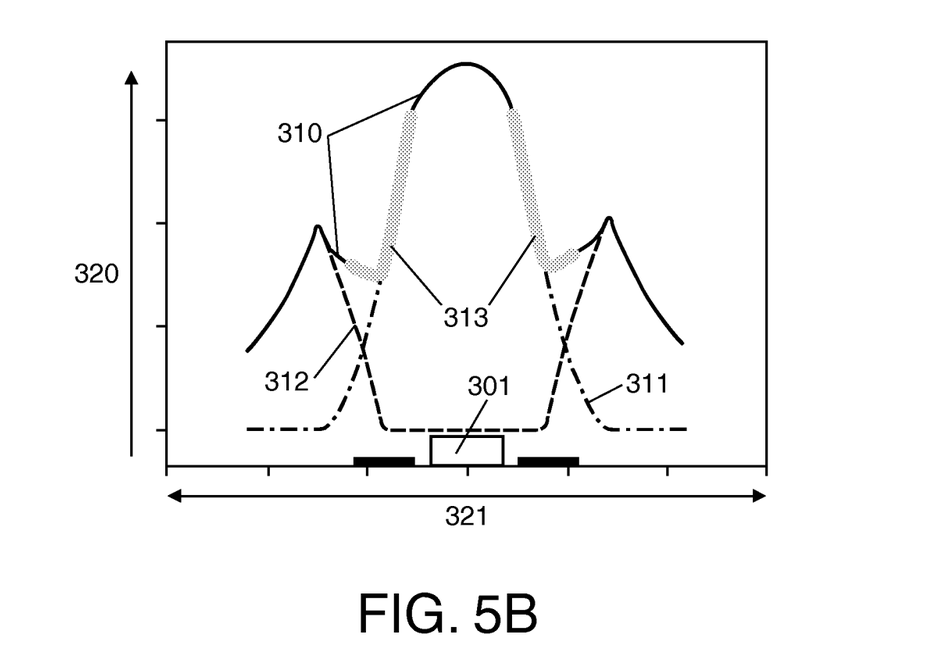
FIG. 5B shows a graph of a common mode signal of an optical joystick when the actuator is in a clicked position.

The actuator of FIG. 1 can also be moved in a vertical direction 8. This results in a variation of the common mode signal as shown in FIG. 5. FIG. 5A shows a graph of a common mode signal of an optical pointing device, such as a joystick, when the actuator is in a released position. In the graph the vertical axis 320 represents irradiation and the horizontal axis 321 represents the position from the center of the reflected light source, i.e. the reflective portion reflecting light. When the actuator is in its rest position the center of the reflected light source will lie straight above the light source 301.

When the actuator is in the released position, the reflective surface is at a greater distance from the detector, and the total irradiance 310 which is the sum of the irradiance from the reflective surface 311 and the irradiance from extra reflection 312, which might be due to light being reflected by other parts of the device than the reflective surface 312, is relatively low. Extra refection 312 is for example the total internal refection from a transparent casing of the detector. Correspondingly the irradiance received at the detection units 313 is relatively low as well.

In FIG. 5B a graph is shown of a common mode signal of an optical joystick when the actuator is in a clicked position. Because the reflective surface now is closer to the light source 301, the irradiance from the reflective surface 311 is higher. As the irradiance from extra reflection 312, due for example to the total internal reflection of light by the casing of the detector, remains the same, a higher total irradiance 310 is detected by the detection units, leading to a corresponding higher common mode signal.

Figure 6:
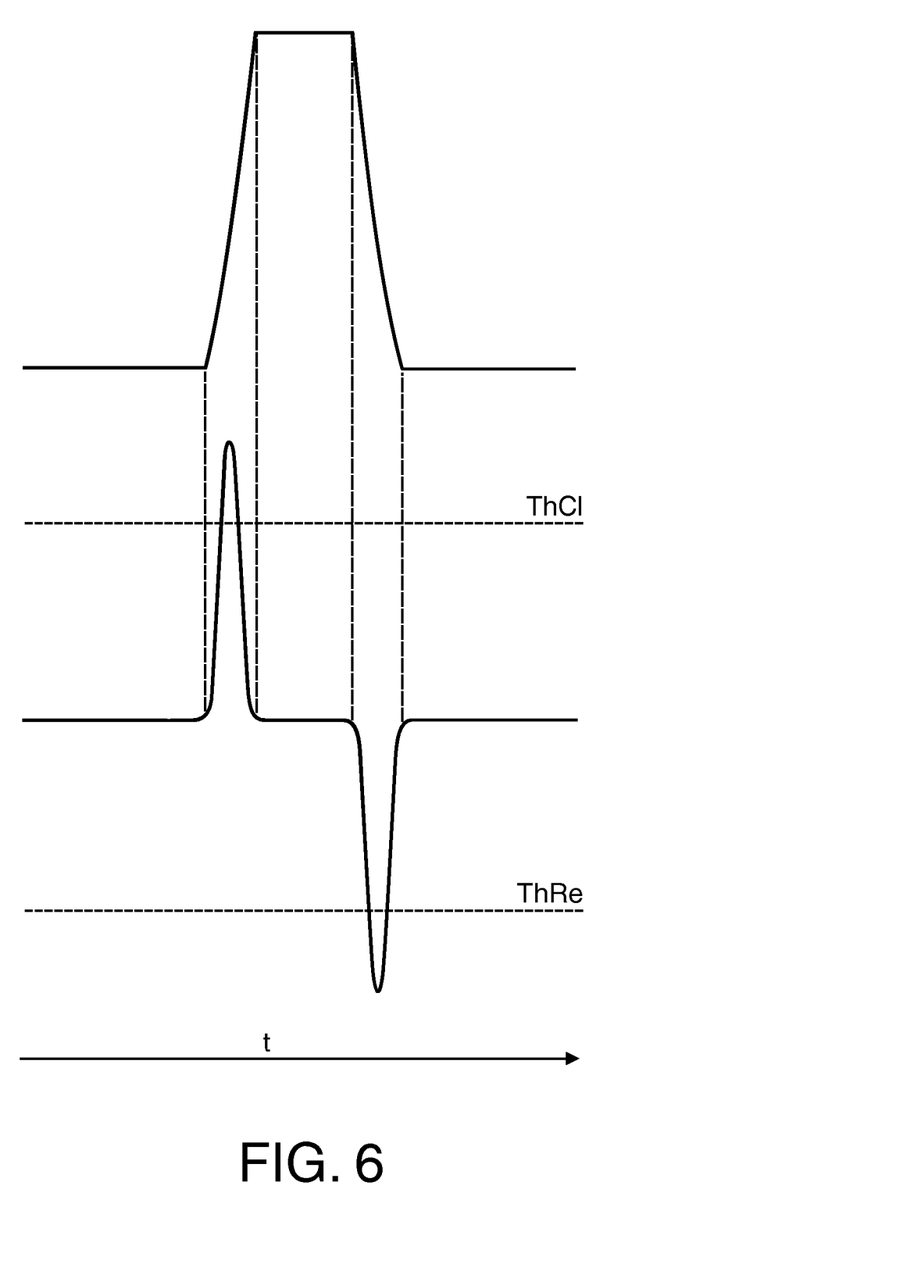
FIG. 6 shows a graph of a common mode signal and its derivative over time which can be used to determine click- and release actions.

FIG. 6 shows a graph of a common mode signal comprising the sum of at least two, preferably all, signals from detection units in the detector. As positional signals are often signals from individual detection units, the common mode signal can comprise the sum of the positional signals. Alternatively the common mode signal could comprise a signal from additional detection units used for click detection. Many pointing devices also allow a downward movement of the actuator which is normal to the plane spanned by the axial direction about which the actuator can move. Such a downward movement results in an increased common mode signal, as seen for example in U.S. Pat. No. 6,326,948. The common mode signal is often used to define a click action which can be used to effect for example selection, drag-and-drop and action commands of an item under a cursor controlled by the pointing device. A problem with using the absolute value of the common mode signal is that a user pressing down on such a pointing device to move a cursor, often does not keep track of the amount of downward pressure he or she exerts. It can thus occur that a user gradually exerts more and more downward pressure, thus unwillingly causing a click action. The absolute value of the common mode signal is also likely to change due to for example noise, changes in temperature of the detector, or other factors.

To address this problem, the method according to the present invention comprises using the value of the derivative of the common mode signal over time as indicative of a click action, instead of the common mode signal as such. By using the derivative, a sudden change in the common mode signal can be easily detected; if the derivative rises above a predetermined click-threshold ThCl then a clicked action detected. Likewise, if the derivative drops below a predetermined release-threshold ThRe, then a released action is detected. Due to the possible difference in the speeds of the click and release, the absolute values of the click and release threshold values can be different and may be defined separately.

An advantage of using the derivative of the signal is that it is substantially insensitive to drift in the signal and any slow signal change due to unwanted movement of the actuator with respect to the base. However, it is very much sensitive to a sudden change in the common mode signal such as the click and release actions. Using the derivative of the common mode signal, slow and gradual changes in the common mode signal will not lead to a click action, while fast and easy clicking is still possible, resulting in a better reaction of the pointing device to user input.

In the upper graph of FIG. 6, the common mode signal versus time is shown. The actuator is clicked for a period of time, and then released, the common mode signal rising and falling back, accordingly. In the lower graph of FIG. 6, the derivative of the common mode signal is plotted versus time. There is a positive spike corresponding to the click action and a negative spike corresponding to the release action. The click action can be recognized by checking whether the common mode signal has reached a positive threshold ThCl, above which it is defined that the actuator is clicked. Similarly the release action can be recognized using the negative threshold ThRe.

The derivative of the signal can be obtained, for example, using a differentiation circuit in the analog domain, or it can be calculated in the digital domain in a processor. Alternatively, the derivative of the signal can be obtained by subtracting a signal measured in an iteration i to a signal measured in a past iteration, such as iteration i-m, in which m is an integer and equal to or greater than 1. Because the time intervals between the iterations are usually equal, often proportional to the refresh cycle of the host device, the difference in the signals between iteration i and iteration i-m can be considered proportional to the derivative values of the signal.

Based on the click and release signals, in combination with the position and/or tilt of the actuator (also when the actuator is in the clicked position), it is possible to perform a number of functions, such as the drag-and-drop function. To do this, the user can click on a certain item he wants to drag, and then while still keeping the actuator in the clicked position, the user can move the actuator to drag the item to a new location and finally release the actuator to drop the item.

The common mode signal can also be used to implement a zoom function. Such a zoom function enables a user to use the same joystick for moving for example a map on a display, and zooming in and out at any spot of interest. There are several ways to perform the zoom function.

The first way makes use of the position and/or tilt of the actuator. For instance, the actuator can be tilted forwards for zooming in and backwards for zooming out. However, this zoom function should not be confused with other actions such as moving the map. There are several ways to do discriminate the two actions:

Map moving is performed based on the position and or tilt when the actuator is not clicked. The zoom function can be performed by the drag-and-drop function, as follows: first of all click the actuator, then while still keeping the actuator in the clicked position, press it forwards for zooming and backwards for zooming out. When the actuator is released, the control returns to the normal map moving mode.

Map moving is performed by the drag-and-drop function and zooming can be done by moving the actuator forwards/backwards when the actuator is not clicked.

Both the map moving and zooming can be based on position and/or tilt of the actuator when the actuator is not clicked. To discriminate between moving and zooming, the zoom function can be activated and deactivated by single-clicking or double-clicking.

Both the map moving and zooming can be performed by the drag-and-drop function. To discriminate between the two, the zoom function can be activated and deactivated by double-clicking.

The common mode signal can be used to implement a zoom function which is based on a continuous movement of the actuator in a downward direction. The spring that holds the actuator should be designed in such a way that it allows some continuous deformation in the downward direction after the actuator has been clicked down. That means after clicking, the spring can still move further downwards in the continuous manner. The displacement of the movement can be, for instance, in the order of 100 µm. At the end of the movement, the actuator should not touch anything underneath. The zoom function can be performed as follows. First of all the user should locate the cursor at a certain location (for example, on a map) that he wants to zoom in and click the actuator. This click will activate the zoom function. After that the user can further depress the actuator to zoom in, or slightly retract the actuator (but not totally release it from the clicked position) to zoom out. During this zoom action the common mode signal is used as the indication of the zoom level while movement of the actuator can be used to move the cursor.

Alternatively a double-click, instead of a single-click, can also be used to discriminate between the zoom function and the map moving function.

Figure 7:
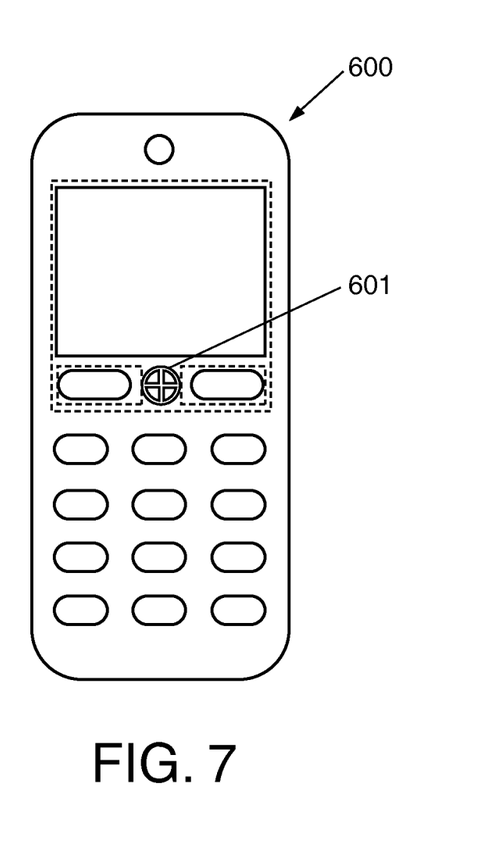
FIG. 7 shows an example of a cell-phone fitted with a small joystick device according to the present invention.

In FIG. 7, a mobile phone (600) is shown which is fitted with the device (601) of the current invention. The mobile phone shown herein is meant as an illustrative example and is not meant in any way to limit the applicability of the method or device of the present invention in any way.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

The invention claimed is:

1. Signal processing method for processing an output signal from a pointing device having a base and an actuator movable with respect to the base, and a detector configured and arranged for providing at least first and second positional signals indicating a position of the actuator with respect to the base along corresponding first and second axes, and for providing a common mode signal indicating a position of the actuator with respect to a third axis of the actuator, the third axis substantially normal to the first and second axes, based upon a sum of magnitudes of the first and second positional signals, the method comprising:
    converting the at least two positional signals into a polar coordinate signal including a magnitude signal,
    thresholding the magnitude signal of the polar coordinate signal to provide a thresholded magnitude signal;
    applying a conversion curve to the thresholded magnitude signal to produce a velocity magnitude signal from the output signal of the pointing device, and
    determining a derivative of the common mode signal.

2. Signal processing method according to claim 1, further comprising:
    converting the velocity magnitude signal and the angle signal to x- and y-velocity signals in an orthogonal coordinate system, and
    generating an output signal when the derivative of the common mode signal rises above a predetermined threshold.

3. Signal processing method according to claim 1, further comprising:

if the magnitude signal is above a threshold, applying the conversion curve to each of the positional signals to produce respective first and second axes velocity signals, and generating another output signal when the derivative of the common mode signal falls below a predetermined threshold.

4. Signal processing method according to claim 3, wherein a different conversion curve is applied to each of the positional signals.

5. Signal processing method according to claim 1, wherein said conversion curve comprises one of an exponential function and a polynomial function.

6. Signal processing method according to claim 1, said method further comprising:

detecting and storing offset signals when the actuator is in a rest position, and detecting positional signals and subtracting the stored offset signals from these.

7. Signal processing method for a pointing device having a base and an actuator movable with respect to the base, and a detector adapted for providing at least first and second positional signals indicating a position of the actuator with respect to the base along corresponding first and second axes, the method comprising:

converting the at least two positional signals into a polar coordinate signal including a magnitude signal, and thresholding the magnitude signal of the polar coordinate signal to provide a thresholded magnitude signal, wherein the detector has a plurality of detection units capable of providing a plurality of corresponding detection unit signals and a common mode signal comprising the sum of magnitudes of the detection unit signals, and the method includes determining a derivative of the common mode signal over time, and at least one of:

generating a first output signal when the derivative rises above a predetermined click threshold indicating click action, and generating a second output signal when the derivative falls below a predetermined release threshold indicating a release action.

8. Signal processing method for processing an output signal from a pointing device having a base and an actuator movable with respect to the base, and a detector configured and arranged for providing at least first and second positional signals indicating a position of the actuator with respect to the base along corresponding first and second axes, the method comprising:

converting the at least two positional signals into a polar coordinate signal including a magnitude signal, and thresholding the magnitude signal of the polar coordinate signal to provide a thresholded magnitude signal from the output signal of the pointing device, wherein the detector is adapted for providing at least first and second positional signals indicating a position of the actuator with respect to the base along corresponding first and second axes, the detector further comprising a plurality of detection units capable of providing a plurality of corresponding detection unit signals and a common mode signal comprising the sum of magnitudes of the detection unit signals, wherein the common mode signal is indicative of the position of the actuator along a third axis substantially normal to the first and second axes, said common mode signal optionally being used as indicative of a zoom level, and the method further includes determining a derivative of the common mode signal over time, and at least one of:

generating an output signal when the derivative rises above a predetermined click threshold, and generating another output signal when the derivative falls below a predetermined release threshold.

9. An optical pointing device comprising a base on which the detector is located, an actuator movable with respect to the base and a reflective portion on a side facing the base, a detector for detecting a relative position between the actuator and the base, the detector including at least one detection unit for detecting at least a part of the light reflected by the reflective portion of an actuator, the base including a light source for emitting light towards the reflective portion of the actuator, and a signal processor, wherein the detector is adapted for providing at least a first positional signal indicating the position of the actuator about a first axis, and a second positional signal indicating the position of the actuator about a second axis, wherein the signal processor is arranged for processing the positional signals from the detector according to a method, the method comprising the steps of:

converting the at least two positional signals into a polar coordinate signal including a magnitude signal, and thresholding the magnitude signal of the polar coordinate signal to provide a thresholded magnitude signal as an output signal from the pointing device.

10. An optical pointing device according to claim 9, wherein the first and second axes are substantially orthogonal.

11. An optical pointing device according to claim 9, in which the signal processor includes an instruction processor arranged for executing a series of instructions for implementing the method of claim 1.

12. An optical pointing device according to claim 9, wherein the optical pointing device is in an integrated package.

13. A signal processor for processing at least two positional signals, wherein the signal processor is configured for processing signals according to claim 1.

14. Signal processing method according to claim 2, the method further includes, based upon a threshold portion of the threshold magnitude signal, eliminating the effects of a resting actuator offset and reducing actuator drift.

15. Signal processing method according to claim 1, wherein the conversion curve comprises one of the following:

an exponential function, a polynomial function, or a non-linear function with an increasing slope.

16. Signal processing method according to claim 1, wherein the pointing device is an optical pointing device including the base on which the detector is located, and a reflective portion on a side facing the base, the detector including a plurality of detection units, each being configured and arranged for detecting at least a part of the light reflected by the reflective portion of the actuator, and the base further including a light source configured and arranged for emitting light towards the reflective portion of the actuator.

* * * * *